UNITED STATES PATENT OFFICE.

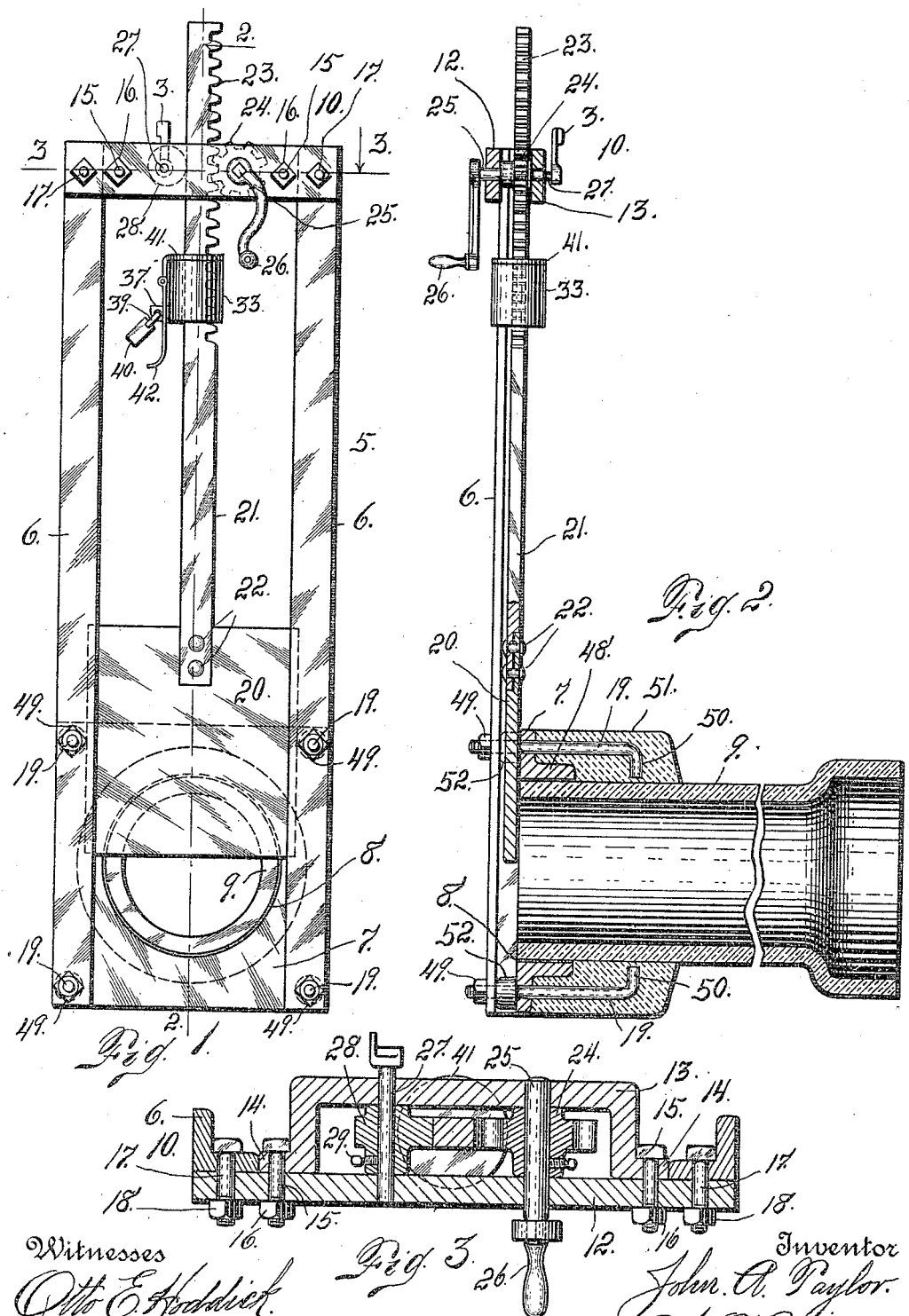

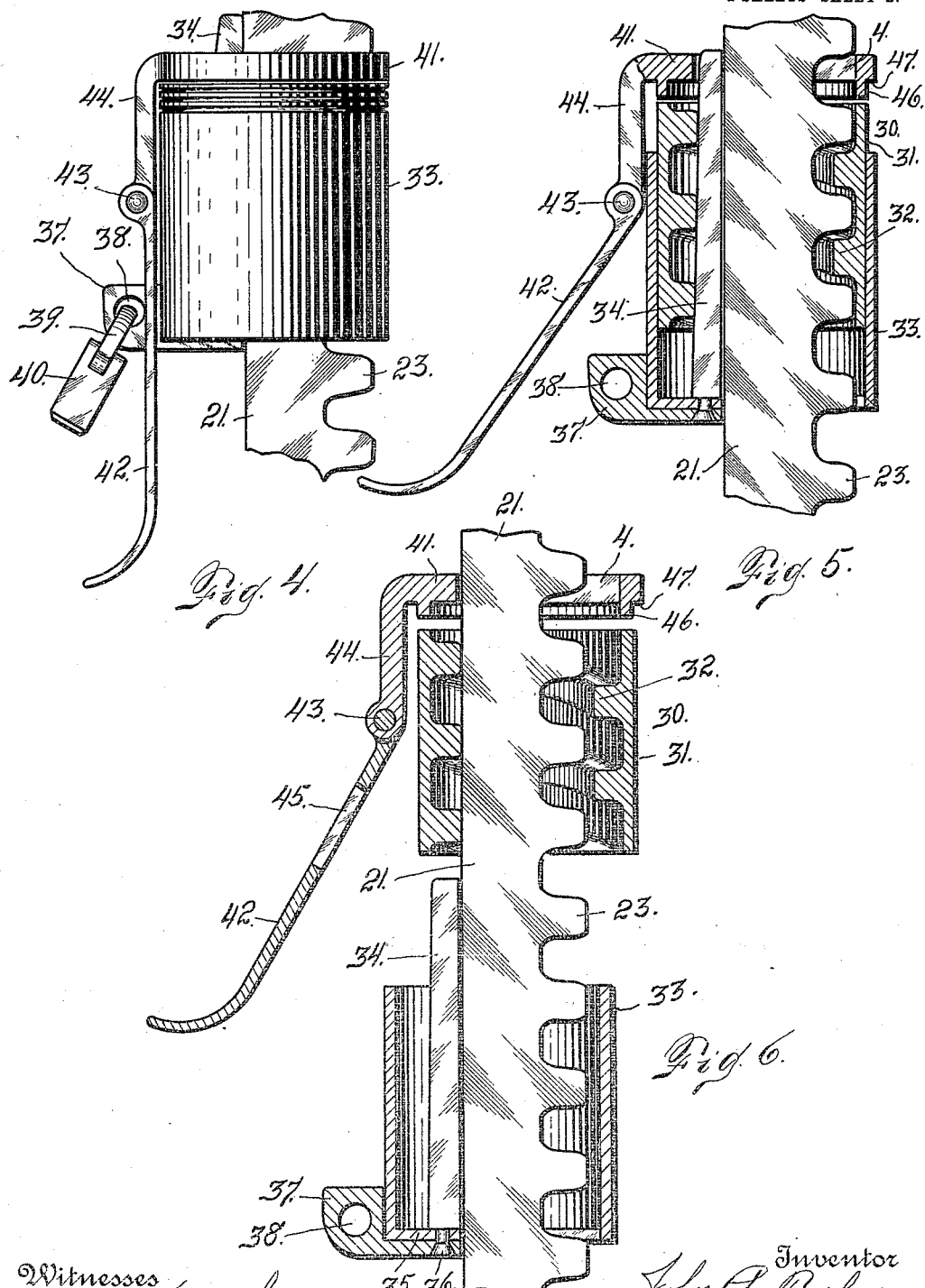

JOHN A. TAYLOR, OF GREELEY, COLORADO.

HEAD-GATE.

957,448.     Specification of Letters Patent.     Patented May 10, 1910.

Application filed June 15, 1909. Serial No. 502,219.

*To all whom it may concern:*

Be it known that I, JOHN A. TAYLOR, a citizen of the United States, residing at the city of Greeley, county of Weld, and State of Colorado, have invented certain new and useful Improvements in Head-Gates; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in head-gates, adapted for use to control the flow of water from a main canal or ditch into a lateral or branch ditch, whereby the consumer is supplied with the necessary water for irrigation purposes.

In sections requiring irrigation, each consumer pays for a certain quantity of water, usually designated in inches.

The object of a head-gate of the class hereinafter described, is to make it practicable for a ditch rider or superintendent to adjust the head-gate mechanism or regulate the same in such a manner that the consumer may open the gate to the width necessary to permit the required number of inches to flow therethrough, but making it impossible for him to open the gate wider.

In my improved construction, the stem or rod of the gate is provided with a cogged rack, adapted to be engaged by a pinion, operated by a hand crank, whereby the gate may be quickly raised or lowered by turning the said crank. Connected with the stem of the gate, below the top of the frame, is an adjustable device, forming a stop to prevent the stem of the gate from passing beyond a certain limit, which is determined by the engagement of the stop with the top of the head-gate frame. This stop is properly adjusted by the ditch superintendent, and locked so that its position on the stem cannot be changed and so that it shall engage the top of the head-gate frame and prevent the further opening of the gate by the consumer, the stop being first so regulated as to allow the required number of inches to flow through the head-gate, or through the opening beneath the gate proper.

An important advantage obtained by my improvement results from mechanism whereby a very accurate adjustment of the stop upon the stem of the gate may be obtained. This is accomplished through the medium of a worm, mounted on the stem and engaging the teeth of the rack. This worm is inclosed by a casing, upon which is mounted a lug provided with an opening adapted to receive the hasp of a padlock. The casing is of such size as to completely conceal the worm. Mounted above the casing is a collar, provided with a hinged hasp, adapted to pass over the apertured lug of the casing. When this hasp is in place and the padlock applied, the stop mechanism is locked against movement on the stem of the gate. When it is desired to adjust the stop, the padlock must be unlocked and removed, and after the hasp is disengaged from the lug of the casing, the latter may be moved downwardly sufficiently to expose the worm, which may then be turned to the desired position upon the stem, permitting the most accurate adjustment.

Other features of my construction will be understood from the detailed description of the mechanism, shown in the drawing.

In this drawing: Figure 1 is a front view of my improved head-gate, the gate proper being shown partly raised or open. Fig. 2 is a vertical section taken on the line 2—2, Fig. 1. Fig. 3 is a horizontal section taken through the top of the head-gate frame, and the mechanism mounted thereon. This section is taken on the line 3—3 Fig. 1, the parts being shown on a larger scale. Fig. 4 is a fragmentary view of the head-gate stem, showing the stop mechanism mounted thereon, and in the locked position, the parts being shown on a larger scale. Fig. 5 is a sectional view of the same, with the parts in the unlocked position, and the casing slightly lowered to permit access to the upper part of the worm for purposes of adjustment. Fig. 6 is a similar view but with the casing dropped downwardly below the worm, whereby the thread or spiral of the latter is adapted to be disengaged from the teeth of the rack, allowing the worm to be quickly moved longitudinally upon the stem. The relative position of the stop mechanism, shown in this view, is preferred when it becomes necessary to move the stop a considerable distance upon the stem, to facilitate rapidity of adjustment.

The same reference characters indicate the same parts in all the views.

Let the numeral 5 designate the headgate frame, which as shown in the drawing, consists of parallel separated upright bars 6, connected at the bottom by a plate 7, having an opening 8 registering with a conduit section 9, through which the water passes from the canal into the lateral of the consumer; the upper extremities of the bars 6 are connected by a top member 10, consisting of a horizontal plate 12, and a U-shaped bracket 13, having flanges 14, through which fastening bolts 15 are passed, the said bolts being secured in place by nuts 16. The top plate 12 is secured to the upper extremities of the uprights 6 by bolts 17, held in place by nuts 18. The upright frame bars 6, as shown in the drawing, are angle shaped or formed of what is known as angle iron. These bars are secured to head plate 7 by bolts 19. The head-gate proper, which is designated by the numeral 20, is provided with a stem or rod 21, whose lower extremity is secured to the gate by rivets 22. One edge of this stem is provided for any desired distance with cogs or teeth 23, adapted to be engaged by an operating pinion 24, mounted on a spindle 25, journaled in the top member of the head-gate frame. One extremity of the spindle is provided with a crank 25, having a hand piece 26 for convenience of manipulation. As this pinion is rotated, while in engagement with the cogged rack, or teeth of the stem 21, the latter may be quickly raised or lowered as may be desired. Journaled in the top member of the head-gate frame, is a second spindle 27, upon which is mounted an eccentric cam 28, secured to the spindle by a set bolt 29. The function of this cam is to lock the head-gate against downward movement after it has been raised to the desired limit. When it is desired to raise or lower the gate, the cam is adjusted to throw its maximum point of eccentricity away from the stem of the gate.

Mounted upon the stem 21, below the top of the head-gate frame, and engaging the teeth 23 of the rack, is a worm 30 composed of a sleeve 31, having a spiral rib or thread 32, formed on its inner surface. The interior caliber or opening of this sleeve inside of the thread 32, is of sufficient diameter to allow the worm to slide freely upon the rack, the thread of the worm passing outside of the teeth of the rack. This worm, however, is adapted to be inclosed by an outer casing 33, carrying a vertically disposed key or spline 34, whose lower extremity is attached to the bottom 35 of the casing, by a rivet 36, which also secures a lug 37 to the lower part of the casing. This lug is provided with an orifice 38, adapted to receive the hasp 39 of a padlock 40. This key 34 is removed from the inner surface of the casing a sufficient distance to allow the worm 30 to pass between the wall of the casing and the key. When, however, this occurs, the thread 32 of the worm is drawn into engagement with the cogs or teeth 23 of the rack of the stem (see Fig. 5). When the parts are in this position, the worm may be adjusted on the stem by turning the same with its thread or spiral rib in engagement with the teeth of the rack.

Mounted upon the stem above the worm, is a top plate or disk 41, slotted, as shown at 42 to allow the rack, together with the upper extremity of the key 34, to enter. When it is desired to lock the worm and casing in the assembled relation, a hasp 42, which is hinged at 43 to the depending arm 44, formed on the disk, is so adjusted that the lug 37 passes through an opening 45, formed in the hasp 42. When the last named hasp is in this position, the hasp 39 of the padlock 40 is passed through the opening 38 in the lug, after which the padlock is locked (see Fig. 4). When the parts are in this position, the stop mechanism is incapable of independent adjustment upon the stem of the gate.

The top 41 of the stop mechanism is provided with a short depending flange 46, above which is located a shoulder 47, adapted to engage the casing 33 when the parts are assembled and in a locked position. This flange 46 is located within the upper extremity of the casing 43, so that the parts are neatly assembled when locked in place, as heretofore explained.

The extremity of the conduit section 9 adjacent to the head-gate frame, enters a circular opening formed in the head plate 7, which is provided with a rearwardly projecting flange 48, also engaging the conduit. The head plate is provided with integral lugs 52, which are provided with openings registering with the openings in the plate 7, through which the bolts 19 are passed. These bolts are secured in place by nuts 49, which are screwed into engagement with the upright bars 6. The lugs 52 are just the depth of the rearwardly extending flange or member of the angle iron bars 6, thus leaving a space between the end of the conduit section 9 and the forward flange of the bars, within which the gate 20 is allowed to slide freely. The inner extremities of the bolts 19 are turned inwardly, as shown at 50, the portion of the bolts beyond the head-gate being embedded in a cement covering 51, which is located in the rear of the head plate and surrounding the conduit section.

From the foregoing description, the use and operation of my improved head-gate will be readily understood.

Assuming that the stop mechanism is in the locked position, as shown in Figs. 1, 2 and 4, if it is desired to adjust the stop mechanism upon the stem of the gate, the lock 40 will be unlocked and its hasp removed from the lug 38, after which the hinged hasp 42 will be disengaged from the said lug. The casing 33 will then be lowered to the position shown in Fig. 5, exposing the upper portion of the worm 30 sufficiently to allow the ditch rider or superintendent to turn the worm upon the gate stem sufficiently to accomplish the desired movement either upward or downward, as may be required. The position of the parts just explained is suitable where only a slight adjustment or movement of the stop mechanism upon the stem is desired, If, however, it is desired to move the stop mechanism a considerable distance upon the stem, the casing 33 will be allowed to drop downwardly sufficiently to completely disengage the key 34 from the worm, in which event (see Fig. 6) the worm may be moved laterally upon the stem to disengage its thread 32 from the teeth of the rack upon the stem. The worm may then be slid freely either upwardly or downwardly until approximately the correct position is reached. The casing may then be returned to its normal position, the worm being shifted to bring its thread into engagement with the teeth of the rack, and allowing the key 34 to enter the worm on the plain or untoothed edge of the stem. The worm may then be turned to accurately adjust it, after which the casing will be moved upwardly to its original position, completely concealing the worm and allowing the hasp 42 to be connected with the lug 47, after which the padlock will be connected with the lug in the manner heretofore explained.

Ordinarily, the ditch superintendent simply adjusts the stop mechanism upon the stem, making it possible for the consumer to use the exact number of inches of water to which he is entitled, leaving it for the consumer himself to open the gate. Assuming that this is the case, whenever it is desired to raise or lower the gate within the limits permitted by the stop mechanism, the crank 25 is turned whereby the pinion is rotated, and being in engagement with the teeth of the rack upon the stem, the latter, together with the gate, will be quickly raised or lowered to the desired position of adjustment. When the gate is open to any degree, the eccentric cam 28 is adjusted to bring its part having the maximum degree of eccentricity into engagement with the plain edge of the stem, whereby the gate is locked against downward movement by gravity, which might occur if the cam or some other suitable resisting device were not employed.

The spindle 27 on the eccentric cam is equipped at one extremity with a hand crank 3 to facilitate adjustment.

Having thus described my invention, what I claim is:

1. The combination with a head-gate, having a toothed stem, of stop mechanism mounted thereon, and including a worm engaging the teeth of the stem for purposes of adjustment, and means for locking the worm against adjustment upon the stem of the gate, substantially as described.

2. The combination with a head-gate, having a toothed stem, of a worm mounted on the stem, and engaging the said teeth, a casing adapted to surround the worm and conceal the latter, means for locking the casing in its assembled relation with the worm, and means for preventing the rotary movement of the casing and the worm upon the stem, substantially as described.

3. The combination with a head-gate, of stop mechanism mounted on the stem of the gate, the stem being toothed on one edge, a worm mounted on the stem, its interior being of sufficient diameter to permit its thread to be moved laterally out of engagement with the teeth of the stem, a casing adapted to surround the worm and having a key or spline adapted to pass between the plain edge of the stem and the thread of the worm, whereby the thread of the worm is thrown into engagement with the teeth of the stem, the casing being connected with the stem to prevent rotary movement, while the worm is allowed to rotate, substantially as described.

4. The combination with a head-gate, having a stem toothed on one edge and plain on its opposite edge, of a sleeve surrounding the stem, and having an interior spiral thread adapted to engage the teeth of the stem, the interior of the sleeve being of sufficient diameter to allow the sleeve to be moved laterally on the stem to disengage its thread from the teeth whereby the sleeve may slide vertically on the stem, and a casing mounted on the stem and adapted to surround the sleeve, the casing having a key or spline adapted to pass between the plain edge of the stem and the thread of the sleeve, whereby the said thread may be brought into operative engagement with the teeth of the stem, for the purpose set forth.

5. The combination of a head-gate, having a stem toothed on one edge and plain on its opposite edge, of a sleeve surrounding the stem and having an interior thread adapted to engage the teeth of the stem, a casing adapted to surround the sleeve and slidable thereon, the casing being locked against rotary movement on the stem, but slidable thereon and means for locking the sleeve and casing in assembled relation, the casing concealing the sleeve to prevent access thereto for rotary movement, substantially as described.

6. The combination with a head-gate, having a stem provided with a toothed portion, of a sleeve mounted on the stem and having an interior thread, engaging the teeth of the stem, a casing adapted to surround the sleeve and slidable upon the sleeve and stem, but locked against rotary movement, and a plate adapted to engage and close the upper extremity of the casing to conceal the sleeve, the plate being separate from the casing, and provided with a hasp, the casing having an apertured lug adapted to pass through the opening in the hasp, and a lock connected with the lug, whereby the casing is locked in a position to conceal the sleeve and prevent access thereto for purposes of adjustment, substantially as described.

7. The combination with a head-gate, having a stem, of a worm mounted on the stem, the latter being toothed to engage the worm, a casing surrounding the stem and inclosing the worm, the casing being locked against rotary movement on the stem, but normally slidable on the stem and worm, the casing having a separable part adapted to close its upper extremity, and means for locking the separable part in contact with the upper part of the casing, whereby the worm is completely concealed substantially as described.

8. The combination with a head gate frame, having a head plate at its lower extremity and a conduit section, surrounded by the head plate, which is open to receive the said conduit, of means for securing the conduit section and the head gate frame in operative relation, comprising bolts passed through the frame of the gate and the head plate, and a cement body applied to the conduit, and in which the inner portions of the bolts are embedded, for locking purposes, substantially as described.

9. The combination with a conduit section and a head gate frame, comprising side bars and a head plate, the latter being provided with an opening to receive the conduit section and having a rearwardly extending flange engaging said section, of means for securing the head gate frame to the conduit section, including bolts passed through the bars of the frame, and the head plate, the rear extremities of the bolts being bent for anchoring purposes, and a body of cement surrounding the conduit section, and in which the bolt portions extending beyond the head plate are embedded and anchored, substantially as described.

In testimony whereof I affix my signature in presence of two witnesses.

JOHN A. TAYLOR.

Witnesses:
EVA NEWTON,
G. W. ALCOCK.